July 19, 1927.

C. E. REED 1,636,665

EARTH BORING DRILL

Filed March 1, 1927

Clarence E. Reed INVENTOR.

July 19, 1927.

C. E. REED 1,636,665

EARTH BORING DRILL

Filed March 1, 1927

Clarence E. Reed INVENTOR.

BY

ATTORNEYS.

July 19, 1927.  
C. E. REED  
1,636,665  
EARTH BORING DRILL  
Filed March 1, 1927  7 Sheets-Sheet 3

Clarence E. Reed  INVENTOR.

BY  
Spear, Middleton, Donaldson & Hall  
ATTORNEYS.

July 19, 1927.
C. E. REED
1,636,665
EARTH BORING DRILL
Filed March 1, 1927
7 Sheets-Sheet 4
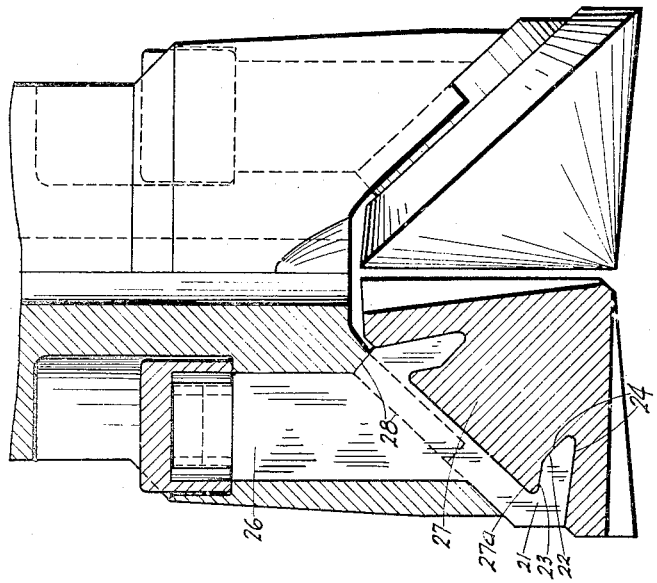
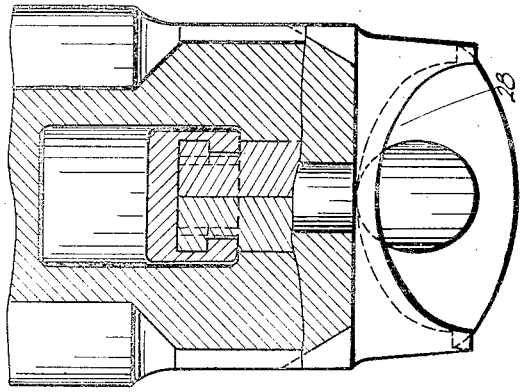
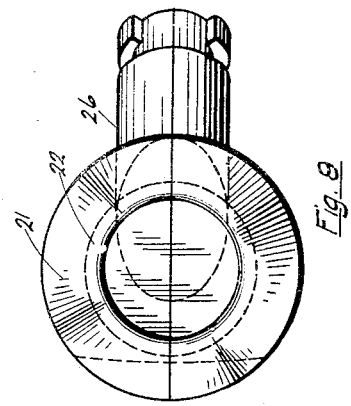
Clarence E. Reed, INVENTOR.
BY
ATTORNEYS.

July 19, 1927.　　　　C. E. REED　　　　1,636,665
EARTH BORING DRILL
Filed March 1, 1927　　　　7 Sheets-Sheet 6

Clarence E. Reed. INVENTOR.

BY
ATTORNEYS.

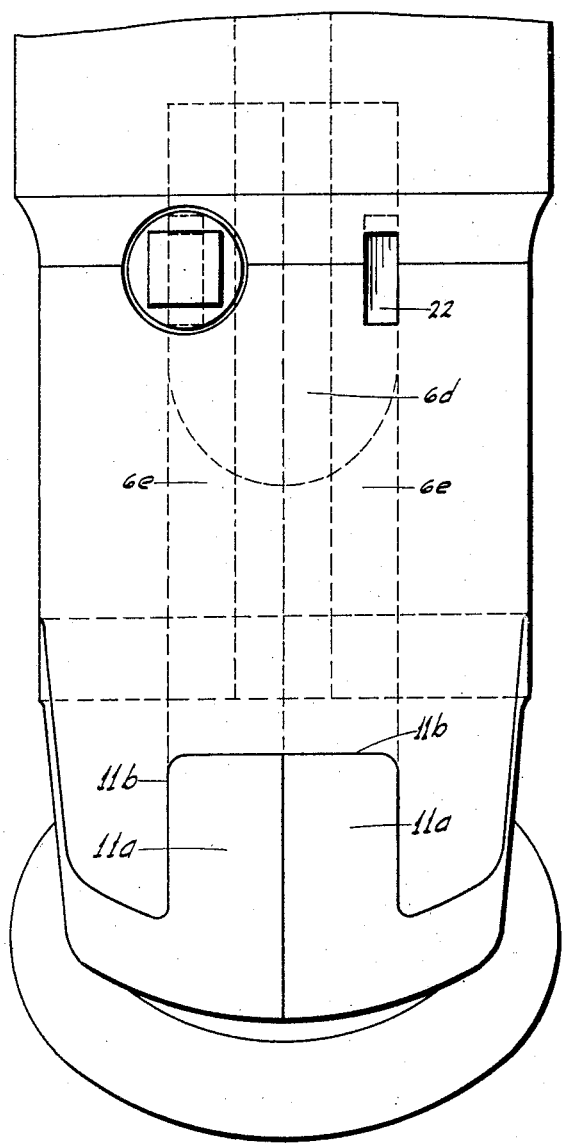

Patented July 19, 1927.

1,636,665

UNITED STATES PATENT OFFICE.

CLARENCE E. REED, OF WICHITA, KANSAS.

EARTH-BORING DRILL.

Application filed March 1, 1927. Serial No. 171,833.

The invention relates to earth boring drills of the general type having an inverted V shaped recess in the lower end of its head with a conical roller cutter on each of the opposing downwardly diverging walls defining said recess. One object of the invention is to employ a one piece bit head and to provide for the ready assembly with said head or removal therefrom of the conical roller cutters, said roller cutters when in place occupying the recess to the extent necessary to cut the entire area at the bottom of the hole.

Another object of the invention is to provide a roller cutter and its spindle of such form that they can be assembled outside the head and inserted or removed as one body, it being understood that said spindles project downwardly and inwardly in convergent relation from the opposing downwardly and outwardly inclined end walls of the said recess.

A further object of the invention is to provide a detachable spindle and roller cutter construction by which the roller cutter can be assembled with the spindle or disassembled therefrom while said spindle is outside of the head, but by which said roller cutter will be retained on the spindle against removal, and in proper working position, when the spindle with said roller cutter mounted thereon is attached to the head.

An additional object is to provide a rugged construction in which the thrusts will be distributed into the one piece head, this involving the employment of a seat recess in the ceiling or inclined wall of the main recess in which the base of the spindle is held, the wall of this seat recess presenting a shoulder to sustain the thrust exerted upon the spindle.

Other objects of the invention will be clear from the following description.

The invention may assume different forms as will be pointed out hereinafter.

In the accompanying drawings

Fig. 7 is a view of another form of the invention, partly in section and partly in elevation.

Fig. 8 is a view of the spindle and its shank of Fig. 7.

Figure 9A:
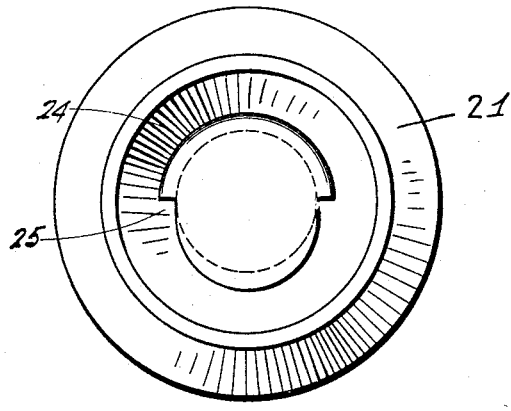
Fig. 9 is a sectional view.

Fig. 9ª is a face view of the base of the cone cutter.

Figure 10:
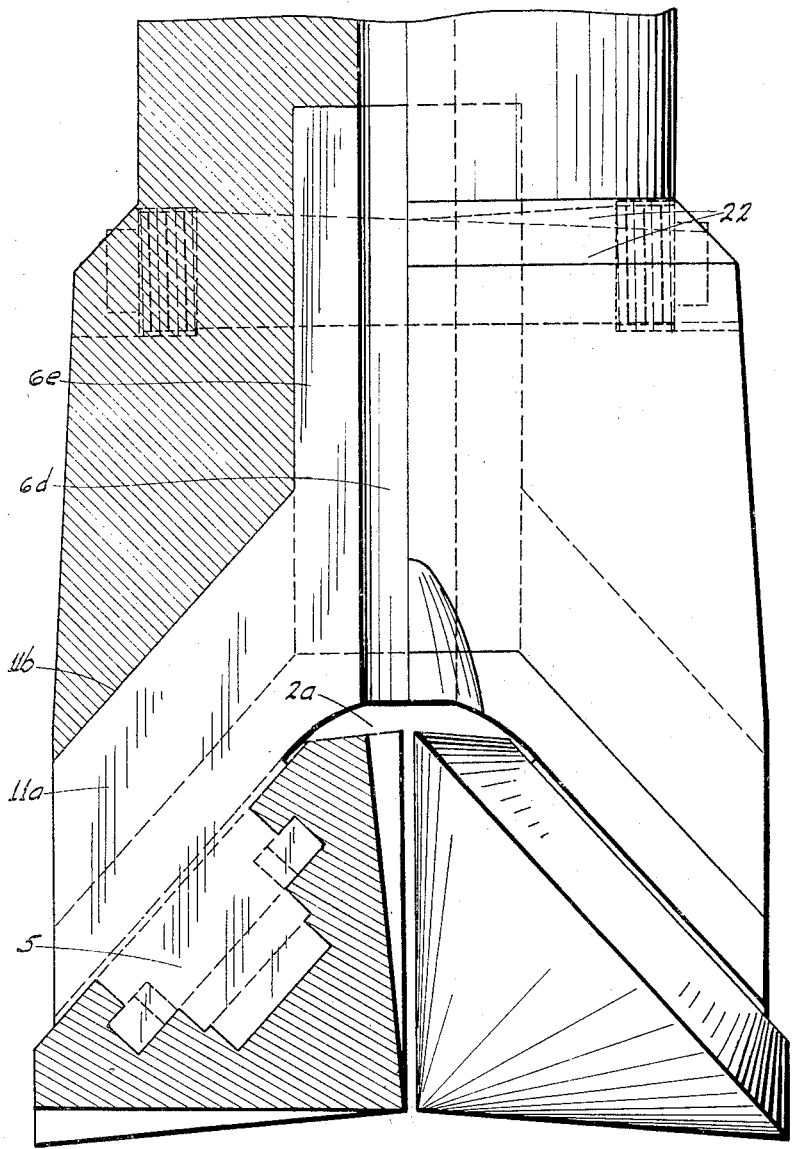

Fig. 10 is a sectional view of a further form of the invention.

Fig. 11 is a side view of Fig. 10.

Figure 12:
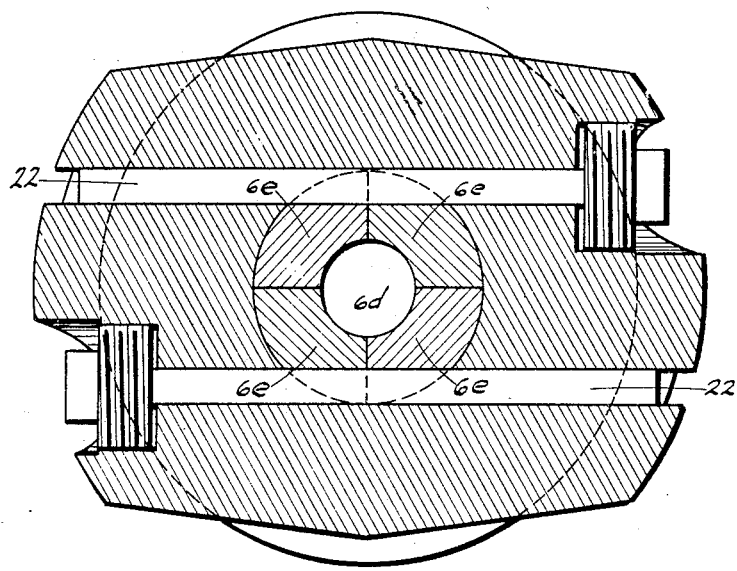

Fig. 12 is a sectional plan view of Figs. 10 and 11.

Referring first to Figs. 1 to 6 inclusive, 1 indicates the bit head having an inverted V shaped recess 2 in its lower end in which are mounted rotary conical cutters 3. These cutters are designed to cut the entire area at the bottom of the hole being drilled and hence the two opposing cutters occupy substantially the entire space from side to side of the recess. Each cutter extends slightly beyond the outer side surface of the drill head to cut clearance as is usual in deep well drills. The cutters are assembled in close proximity to each other and they turn on axes which converge downwardly and inwardly in respect to the recess and the vertical axis of the drill head.

It is desirable to use a bit head of one piece and as the cutters are mounted on spindles projecting substantially at right angles to the inclined end walls 4 of the recess 2, special means are employed by me whereby the cutters may be inserted into the recess so that each cutter organization will occupy its own portion of the recess, and during the act of assembly will not cross the vertical axis of the drill in reaching the position it is to occupy.

In carrying out this portion of the invention I provide a construction whereby the roller cutter and the spindle upon which it is to turn are assembled outside the head to be handled as one unit, and then this unit is inserted into the head through the V shaped recess at the lower end thereof and there secured with the spindle projecting from the head into the recess and with the roller cutter rotatably mounted thereon.

Figure 1:
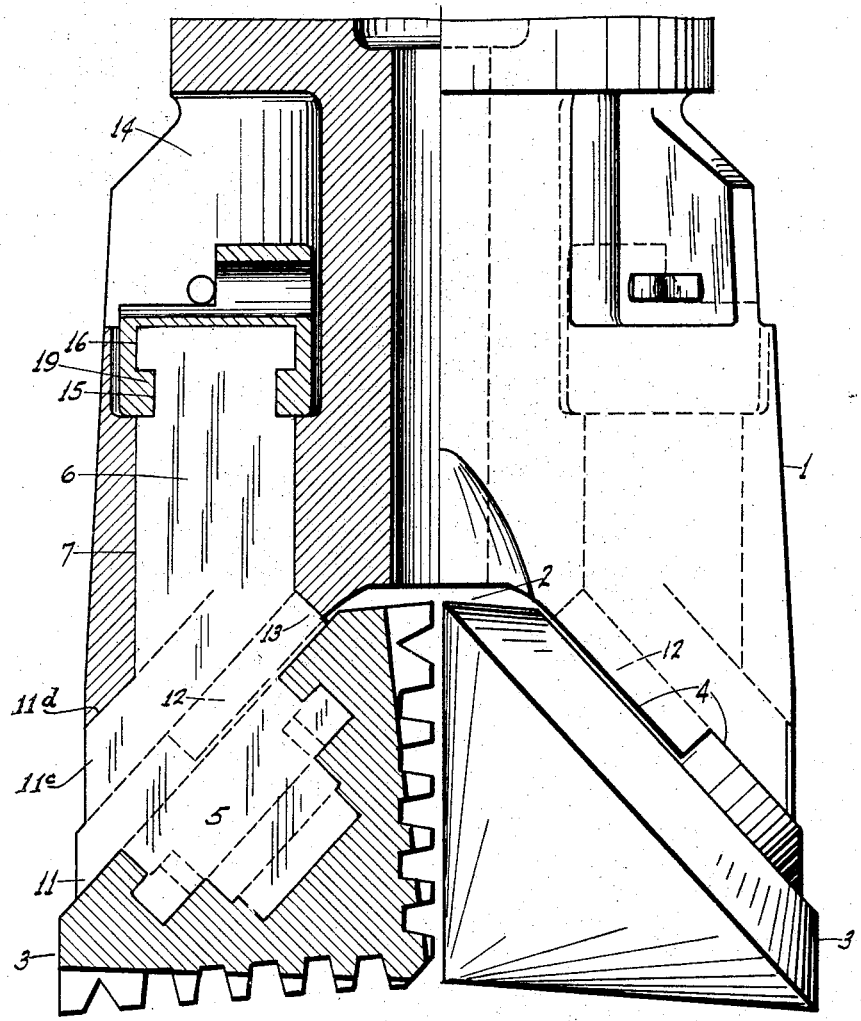
Figure 1 is a combined side view and central vertical sectional view of a bit head embodying my invention in one form.

In one form Figs. 1 to 6 the spindle 5 is of general cylindrical shape but of stepped formation presenting shoulders at 5ᵃ. The spindle has a shank 6 at such an angle thereto that as shown in Fig. 1 while the shank when in position in the socket 7 of head will extend substantially parallel with the vertical axis of the bit head, the axis of the spindle portion 5 of this member will extend at right angles to the downwardly and outwardly inclined wall 4 of the recess 2.

Figure 6:
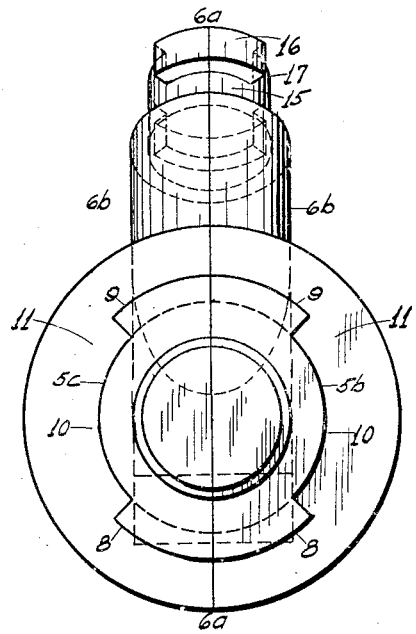
Fig. 6 is a view looking at the face of the spindle with its shank, said spindle and shank being split lengthwise into halves.
Figure 5A:
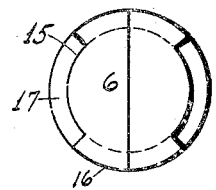
Figure 5B:
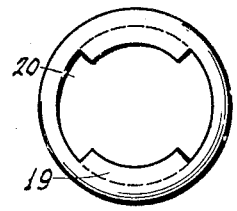

The spindle as well as the shank thereof is split lengthwise into halves along the line 6ᵃ, 6ᵃ of Fig. 6, the direction of the split being radial to the axis of the bit head, when the parts are inserted therein. The two halves of the spindle are marked 5ᵇ, 5ᶜ and the halves of the shank portion are marked 6ᵇ. Each half of the spindle is integral with its half of the shank.

The spindle is provided with segmental flanges 8 and 9. One half of each of these flanges is mounted on the half 5ᵇ of the spindle and the other half of each segmental flange is mounted on the other half 5ᶜ of the spindle. The gateways 10 are left between the ends of the segmental flanges. Each rotary cutter 3 has a shouldered bore or recess 3ᵃ with a flange 3ᵇ at the entrance thereto. This flange has gateways 3ᶜ corresponding in shape, size and spacing to the halves of the segmental flanges 8 and 9 on each of the halves of the spindle, and the gateways 10 of the spindle are of the size, shape and spacing of the sections of the flange 3ᵇ of the cutter. This construction provides the elements of a bayonet-like joint between the cutter roller and the spindle when they are assembled. In making this assembly first one half of the spindle would be coupled up with the roller cutter by introducing it into the bore of the cutter. To do this the half portions of the flanges 8 and 9 say on the half 5ᵇ of the spindle would be inserted through the gateways 3ᶜ of the roller cutter. The roller cutter would then be turned around on this half portion of the spindle half a revolution to clear its gateways 3ᶜ, and then the other half portion of the spindle is inserted into the corresponding stepped or shouldered bore of the roller cutter through the gateways 3ᶜ in the manner just described in connection with the first half of the spindle. As a result of this assembling action the two halves 6ᵇ of the shank 6 are brought together and then the whole assembly can be handled as one body for insertion into the drill head. When the roller cutter rotates on this spindle it will be retained thereon by its flange 3ᵇ engaging back of the flange on the spindle. In the revolution of the roller its gateways 3ᶜ can never simultaneously register with the flanges on both halves of the spindle because said gateways are only of a size adapted to permit the passage therethrough of one half of the flange 8—8 or 9—9. Thus the roller cutter will be retained in place on the spindle by either one or the other or both of the spindle halves when the unit is attached to the bit head. The roller cutters will be held against falling towards each other and the initial gauge of the cutter organization will be maintained at all times.

The roller cutter with its spindle and spindle shank in assembling with the bit head are moved into place in a direction substantially parallel with the vertical axis of the drill head, the shank being received in the socket 7. The cutter roller assembly in this act of being placed in position is kept within its own portion of the recess 2, i. e. that portion of the said recess lying to one side of and adjacent the vertical axis of the drill head, leaving the other portion of the recess on the other side of said axis to be occupied by the opposing roller cutter assembly. When the latter is inserted, it, like the one already inserted, does not have to cross the vertical axis of the drill head into that portion of said recess 2 belonging to and now occupied by the first inserted cutter assembly.

Thus these two roller cutters can be located in juxtaposed relation in a one piece head. Each roller cutter assembly readily and expeditiously can be placed or removed. Each spindle bearing has a base portion or flange 11 desirably of circular form to fit into a seat recess 12 of the bit head and against a shoulder or wall 13 defining said recess.

This shoulder or wall takes the thrust and distributes it into the body of the bit head. This base flange 11 of the spindle and shank 6 being at an angle to each other, and both bearing in the head, will be prevented from turning in relation to the head, and the means for retaining the shank in the head will have no duty to perform excepting that of preventing longitudinal displacement of the shank downwardly. For this purpose the upper end of the shank 6 projects into a recess 14 in the side of the head. Each half of the shank has a reduced neck portion 15 with an overhanging flange 16, and a gateway 17. A locking collar is provided with flanges 19 and gateways 20.

This locking collar is slipped over the upper end of the shank so that its flanges pass through the gates in the shank and it is then given a quarter turn so that its flanges will underlie the flanges of the shank. Any suitable retaining means may then be inserted to prevent the locking collar from turning the reverse way. The collar finds a bearing at the bottom of the recess and the shank is thus retained in the head. The parts can be dismounted with facility equal to their ease of assembly in the head as above set forth.

In Figs. 7, 8 and 9 I show another form of the invention indicative of the fact that the features involved may have different physical embodiments.

In this form the spindle is in halves divided from each other in a plane lengthwise thereof as in the first form and radial to the vertical axis of the head. Each half is made up of a claw 21 or flange having a tapered outer surface instead of a shouldered or stepped surface.

The interior of the claw is of cylindrical formation at 22 and inclined at 23. The roller cutter is formed with a groove or recess 24 to fit the claw, and it is provided with gateways at 25 so that the halves of the spindle can be inserted into the groove or recess. The spindle halves are each integral with one half of the shank 26 which halves are divided from each other lengthwise of the shank.

The roller cutter is held in place by the enlargement at 27$^a$ of its central stem portion 27 fitting the interior of the assembled halves of the claws forming the spindle. This spindle has a base portion at 28 fitting a seat recess 29 in the head like the form first described.

Provision is made for supplying flushing fluid to the roller cutters, i. e. the central conduit 1$^a$. In Figs. 10, 11 and 12 I show a different form of spindle and shank. Here the spindle 5 has a shank 6$^e$ which lies in an opening or socket at the center of the bit head. The shank has a channel 6$^d$ therethrough extending vertically at the axis of the bit head for the flushing fluid. The shanks of the two juxtaposed roller cutters bear upon each other at the axial plane of the bit head.

Each shank is formed in halves and the spindles are formed in halves like in the form first described. The base portion 11$^a$ of the spindle fits in an inclined seat recess 11$^b$ in the wall of the inverted V shaped recess 2$^a$ of the head and sustains thrusts. The outer side of base portion 11$^a$ is inclined upwardly and inwardly. The parts described are drawn into the head and retained by wedges 22 passing through the head and through the halves of the shanks. The bit head of this form is of one piece, and the assembly of the roller cutters with their spindles and the units with the one piece bit head takes place in a manner substantially the same as before described.

It will be noted as one aspect of the invention that in all forms the roller cutter can be placed on or removed from the spindle when the latter is detached from the head, but when the spindle is locked into the head then the roller cutter is locked on the spindle in the sense that while it is free to rotate it cannot be removed from the spindle and it is retained thereon in the intended position to cut the hole of the prescribed gauge. The final act therefore of locking the spindle to the head assures the retention of the roller cutter on the spindle.

In other words, so long as the spindle is in its place in relation to the head the roller cutter will be retained on said spindle.

The placing of the shank into head insures the maintenance of its halves together, and this renders the bayonet joint effective in retaining the roller cutters in position.

Figure 2:
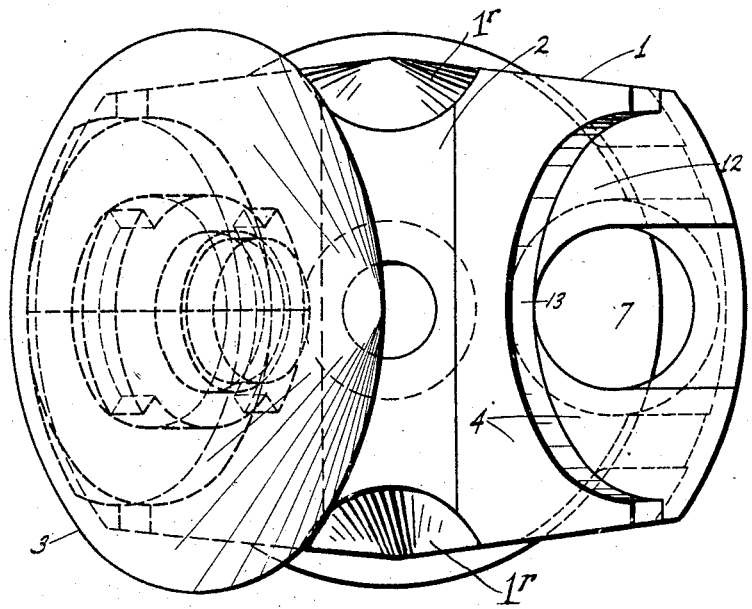
Fig. 2 is a bottom plan view of Fig. 1.
Figure 3:
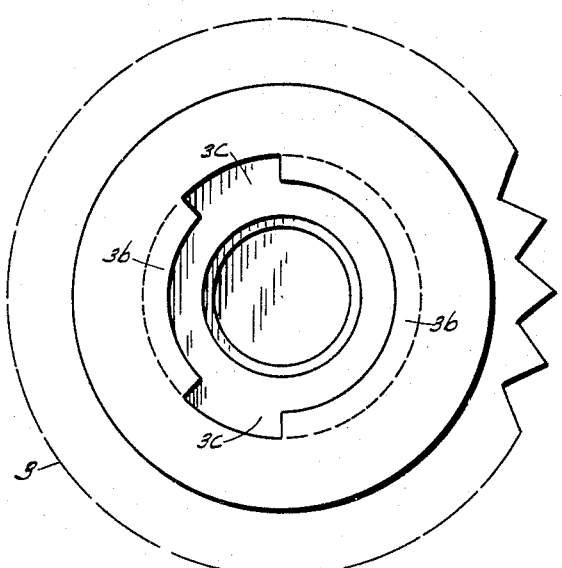
Fig. 3 is a face view of the base of the roller cutter.
Figure 4:
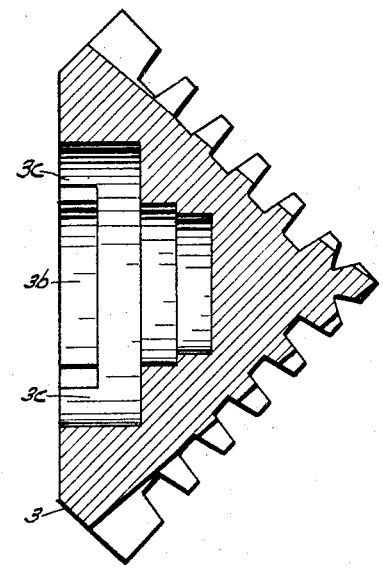
Fig. 4 is a sectional view of the cutter.
Figure 5:
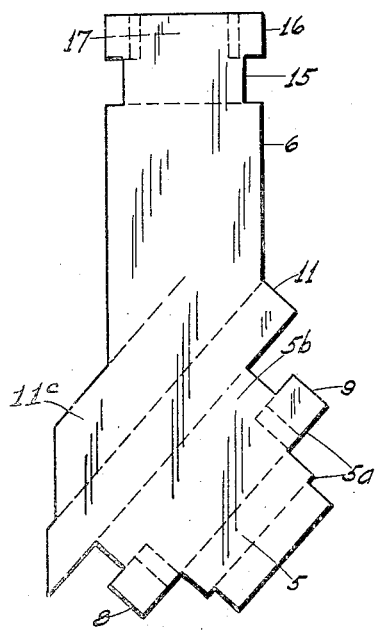
Fig. 5 is a side view of the spindle detached.

For convenience of illustration I have shown one of the cone cutters diagrammatically in side elevation in Figs. 1, 7, 10, and in perspective in Fig. 2, it being understood, however, that both opposed conical cutters are toothed.

Where features are susceptible of conjoint use although shown in separate forms and figures, they are to be regarded as belonging to those forms in which they may be used.

Thus, for instance, the wedge means may be used in place of the bayonet joint cap for holding the spindles in the heads and the hump shown in Fig. 10 may be used in any of the forms of the invention.

A hump is provided on the spindle base at 11$^c$ fitting a corresponding recess 11$^d$ in the bit head, to resist torque. Only the spindle and the thrust sustaining base 11 project beyond the wall of the inverted V shaped recess, the bit head surrounding the back and inner half of the base 11 and sustaining all thrusts.

The specific form of the invention shown in Figs. 7 and 8 is claimed in another application Serial No. 160,668.

I claim:

1. In an earth boring drill, the combination of a one piece drill head having a substantially inverted V shaped recess at its lower end, opposing rotary conical cutters juxtaposed in said recess to cut the entire area at the bottom of the hole, spindles on which said cutters turn, convergent downwardly and inwardly from the diverging walls of the recess and towards the vertical axis of the drill, each of said cutters with its spindle being assembled, with the cutter retained on the spindle, to be handled as a unit and as such inserted into place with the cutters within said V shaped recess and the spindles within the head, and means for detachably holding said units to the head, substantially as described.

2. In an earth boring drill, a one piece bit head having an inverted V shaped recess in its lower end and with seat recesses in the opposing upwardly convergent walls of said recess with thrust sustaining shoulders at the upper ends of said seats, removable bearings, conical roller cutters assembled with and held on said bearings to be handled as one body, said bearings having their bases adapted to fit between the walls of said upwardly and inwardly inclined seat recesses and to engage the thrust shoulders at the upper ends thereof, and means seated in the head for holding the bearings in the seat recesses, said conical roller cutters being juxtaposed on opposite sides of the vertical axis of the bit head, substantially as described.

3. An earth boring drill having a one piece head with an inverted V shaped recess in the lower end thereof, a conical roller cutter, a bearing divided longitudinally into sections in a plane coinciding with the axis of the cutter and interlocked with said cutter, but permitting the cutter to rotate thereon, and means for removably holding the split bearing in the head, substantially as described.

4. A rotary deep well boring drill comprising a one piece bit head having a substantially inverted V shaped recess in its lower end with a seat recess in each downwardly and outwardly inclined wall thereof, spindles convergent downwardly and inwardly in said recess having bases in said inclined seat recesses, a cutter held on each of said spindles to be handled therewith as one body in inserting it into or removing it from the head through said V shaped recess and means for detachably holding the base of the spindle in said inclined seat recess bearing upon the inclined ceiling thereof, the wall and ceiling of said seat recess taking the thrust, substantially as described.

5. A one piece bit head for deep well drilling having a single pair of juxtaposed frusto conical cutters that cut the entire area at the bottom of the hole, bearings for the cutters seated in the head in a recess located at opposite sides of the vertical axis of the head, said bearing being insertible with cutters assembled thereon into place in the recess without crossing the vertical axial line of the bit head, and means for holding the bearing in the head.

6. An earth boring drill having a one piece head with a recess at the lower end thereof, frusto conical rollers disposed at the same end to cut substantially the entire area of the bottom of the hole, a bearing divided longitudinally into sections in a plane coinciding with the axis of the cutter, interfitting flanges holding the cutter securely to the bearing on which it turns and means removably holding the split bearing in the recess.

7. In combination in an earth boring apparatus, a body, a roller cutter and a bearing therefor adapted to be assembled, to be handled as a unit in inserting into or removal from the body, said cutter having a bore in one side with an overhanging flange, and said bearing having a portion fitting into the said bore and under the overhanging flange, said bearing being in longitudinal sections divided on a plane coinciding with the axis of the cutter, said bore being formed with a gate to permit the insertion of the sections of the bearing one after another, and means holding the bearing in the head.

8. In an earth boring apparatus a roller having a recess in one side with a flange portion overhanging said recess, a gate in said flange communicating with said recess, sections of a bearing insertible through said gate and into the recess under the overhanging portion, said sections being inserted one after another and means for holding the bearing in the apparatus.

9. In combination in an earth boring apparatus, a one piece bit head, roller cutters, spindles on which the cutters are mounted, each spindle being divided lengthwise and attachable to its roller cutter to be handled as one body, only by connecting the sections of the said spindle to said cutter, one after the other, and means for detachably securing the spindle in the bit head, substantially as described.

10. In combination in an earth boring apparatus a one piece bit head, roller cutters, lengthwise split spindles on which said cutters rotate, means for holding said spindles detachably in the head, each roller cutter having a bore with a flange at the entrance thereto provided with a gateway communicating with said bore and each section of the spindle having a flange projecting laterally therefrom to pass through said gateway and engage behind the flange of the roller cutter, said sections being insertible into and detachable from the said roller cutter only in succession, substantially as described.

11. In combination in an earth boring drill, a one piece bit head, a roller cutter, a spindle with means for detachably holding it in the head, and a bayonet joint connection between the roller cutter and the spindle, said bayonet joint connection being rendered effective to retain the roller cutter rotatively on the spindle by the act of attaching the spindle to the head, substantially as described.

12. In combination in an earth boring drill, a one piece bit head having a recess in its lower end with depending end walls, a conical roller cutter in the recess juxtaposed to the vertical axis of the drill, a spindle assembled with the roller cutter and insertible into or removable from the head with the cutter as one body, means for holding the spindle detachably to the head and a second roller cutter juxtaposed to the cutter first mentioned and on the opposite side of the vertical axis of the drill, said cutters cutting the entire area at the bottom of the hole, and a spindle for said second roller carried by the head, substantially as described.

13. A roller cutter unit for earth boring drills comprising a bearing with a shank extending at an angle thereto, and a roller cutter having a gateway, said shank and bearing being divided lengthwise into sections, each of which is composed of a bearing portion and a shank portion integral with the bearing portion, each bearing portion having a projection to pass through the gateway and when turned to interlock with a portion of the roller cutter, said sections being insertible into or removable from the roller in succession, substantially as described.

14. In combination in an earth boring drill, a bit head, a bearing detachably mounted thereon, composed of sections divided from each other in the direction of the axis of the bearing and a roller cutter interlocking with the bearing sections to be retained by said bearing while allowing free rotation and means for holding the sections of the bearing in the head, substantially as described.

15. In combination in an earth boring drill, a bit head, a roller cutter unit composed of a bearing with a shank at an angle to the bearing and with a roller cutter interlocking with the bearing to be retained in place thereby while free to rotate, said bearing and shank being split longitudinally into sections for assembly with the roller cutter and means for holding shank in the head, each section of the bearing being integral with its shank section.

16. In combination in an earth boring drill, a bit head having an inverted V shaped recess in its lower end, a bearing having a shank extending into the head, at an angle to the bearing, said bearing and shank being split lengthwise, a roller cutter interlocking with the bearing to be retained thereby, while free to rotate, said bearing having a surface at its base bearing on the inclined wall of the V shaped recess adjacent the junction of the bearing and spindle, and means for holding the shank to the head, substantially as described.

17. In a roller boring drill including a head having a V shaped recess at the lower end thereof, and a frusto-conical cutter, a bearing on whose circular surface the cutter rotates, a base portion seated on the face of the V shaped recess which face inclines downwardly and outwardly from the vertical axis of the head and a shank portion anchoring the base to the head, the axis of the bearing being out of alignment with respect to the axis of the shank, and means locking the shank to the body.

18. In an earth boring drill and in combination, a one piece bit head having an inverted V shaped recess in its lower end, a rotary toothed cutter turnable on an axis substantially at right angles to the downwardly and outwardly inclined wall of the said recess and a bearing assembled with said roller cutter and insertible into or removable from its working position in the recess of the head, together with said roller as a unit, by a movement substantially parallel with the vertical axis of the head, and with the roller juxtaposed to the vertical axis of the head, substantially as described.

19. In an earth boring drill and in combination, a one piece bit head having an inverted V shaped recess in its lower end, rotary conical toothed cutters arranged in said recess in juxtaposition on opposite sides of the vertical axis of the head, to cut the entire area at the bottom of the hole, bearing members on which said cutters turn about axes which are convergent downwardly and inwardly relative to the said vertical axis, each of said bearing members having a shank held in the bit head and extending substantially parallel with the vertical axis of the bit head, substantially as described.

20. A drill bit head having a recess in its lower end with a wall inclined relative to the vertical axis of said head, said inclined wall having a seat recess therein and a bore in the body of the head, the axis of which is inclined to the plane in which the seat recess lies.

21. A drill head according to claim 20 having a recess in its side at the end of the bore, substantially as described.

22. An earth boring drill having a longitudinally split bearing and a roller cutter connected to said bearing by a bayonet joint permitting said cutter to rotate and retaining said roller in place in all circumferential positions thereof relative to said bearing, substantially as described.

23. In combination a drill bit head having a recess in its lower end with a wall inclined relative to the vertical axis of said head, said inclined wall having a seat recess therein and a bore in the body of the head, the axis of which is inclined to the plane in which the seat recess lies, a removable roller support having a spindle projecting from the wall of the head with a base on said spindle in the seat recess, and a shank in the bore, the shoulder of bit head formed by the seat recess sustaining working thrusts.

24. In combination in an earth boring drill, a one piece bit head having on one side of its vertical axis a plurality of communicating recesses, one to receive a shank and the other to receive an enlarged base portion of a spindle, a removable roller cutter support comprising a spindle having said enlarged base portion extending at right angles thereto and a shank extending at an inclination to the axis of the spindle and base portion, said shank being seated within its recess in the head and the base portion lying within its recess but projecting therefrom only enough to afford clearance between the roller cutter and the wall of the head, and a roller cutter covering the spindle and directly adjoining said base portion thereof, and means for holding the roller cutter support in place.

25. In combination in an earth boring drill, a one piece bit head having an inverted V shaped recess at its lower end, with seat recesses in the inclined walls of said V shaped recess, two frusto conical roller cutters, removable supports for said roller cutters, having shanks seated within the head, enlarged base portions at an inclination to the shanks located in said seat recess, spindles projecting directly from the base portions, and roller cutters on the spindles.

26. In an earth boring drill having an inclined wall defining a recess at the lower end and frusto conical rollers that cut the entire area at bottom of hole, a seat recess in the wall opening through the side of drill head, a removable roller support in the seat recess presenting a wearing surface parallel to the side of the bore hole to take scouring of abrasives pressed against side of well, the bit head covering the top and two sides of the removable roller support.

27. In combination in a well drill bit head, a recess at its lower end with a wall inclined relative to the vertical axis of said head, said inclined wall having a seat recess therein and a bore in the body of the head, the axis of which is inclined to the plane in which the seat recess lies, a bearing comprising a spindle portion, a thrust sustaining base at right angles to axis of spindle, a shoulder to carry working thrusts, a hump holding against torque thrusts, and shank for anchoring the bearing, only the spindle portion and thrust sustaining base projecting beyond the wall, the bit head surrounding the back and inward half of base of bearing and supporting all thrusts from the bottom and sides of the well.

28. In combination with claim 27, two frusto conical cutters to cut the entire area at bottom of the well.

29. In combination in a bit head for a well drill comprising frusto conical rollers that cut the entire area of the bottom of the hole, a seat recess in the wall defining the roller recess, the seat recess receiving enlarged bases of removable supports for the rollers, only the spindle portion and a surface on the base at right angles to axis of spindle supporting thrust of the roller, projecting beyond the face of wall defining the roller recess, the bit head thus supporting inward thrusts from reaction of sides of the well in addition to the reactions from the bottom of well.

30. In combination, a one piece bit head having an inverted V shaped recess at its lower end, a seat recess in the inclined wall of said V shaped recess, presenting a thrust sustaining shoulder, said head having a supplemental seat recess narrower than the seat recess first mentioned, a spindle having a base flange in the main seat recess and a hump on said base flange fitting in the narrower seat recess, a roller cutter mounted on the spindle, and means for holding the spindle to the head, substantially as described.

In testimony whereof, I affix my signature.

CLARENCE E. REED.